(12) United States Patent
Murray et al.

(10) Patent No.: US 11,788,908 B2
(45) Date of Patent: Oct. 17, 2023

(54) METHODS AND APPARATUSES FOR QUANTITATIVE SENSING USING RAYLEIGH SCATTERING IN OPTICAL FIBER

(71) Applicant: The Government of the United States, as represented by the Secretary of the Navy, Washington, DC (US)

(72) Inventors: Matthew J. Murray, Alexandria, VA (US); Brandon Redding, University Park, MD (US); Allen Davis, Falls Church, VA (US); Clay Kirkendall, Fairfax, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 136 days.

(21) Appl. No.: 17/027,606

(22) Filed: Sep. 21, 2020

(65) Prior Publication Data

US 2021/0088408 A1 Mar. 25, 2021

Related U.S. Application Data

(60) Provisional application No. 62/903,516, filed on Sep. 20, 2019.

(51) Int. Cl.
*G01M 11/00* (2006.01)
*G02B 6/028* (2006.01)
(Continued)

(52) U.S. Cl.
CPC ............ *G01M 11/30* (2013.01); *G02B 6/023* (2013.01); *G02B 6/0288* (2013.01); *H01S 3/11* (2013.01)

(58) Field of Classification Search
CPC ..... G01M 11/30; G02B 6/023; G02B 6/0288; G02B 2006/12138; H01S 3/11; G01L 1/242
See application file for complete search history.

(56) References Cited

U.S. PATENT DOCUMENTS

| 11,363,945 B2 * | 6/2022 | Hosoda ............... A61B 5/6852 |
| 2019/0101419 A1 * | 4/2019 | Rowen ............ H01S 3/094011 |
| 2019/0257699 A1 * | 8/2019 | Handerek ............. G01K 11/32 |

FOREIGN PATENT DOCUMENTS

| FR | 3034190 A1 * | 9/2016 | ............ G01D 5/353 |
| JP | H04132918 A * | 5/1992 | |

OTHER PUBLICATIONS

Verrier et al. "Off-axis digital hologram reconstruction: some practical considerations", Applied Optics, v. 50, No. 34, Dec. 1, 2011.
(Continued)

*Primary Examiner* — Ellen E Kim
(74) *Attorney, Agent, or Firm* — US Naval Research Laboratory

(57) ABSTRACT

Methods and apparatuses for quantitatively measuring strain in an optical fiber. An optical source comprising an optical beam generator and a pulse generator receives instructions from a controller and generates a pulsed optical beam in response to those instructions. The pulsed optical beam is directed into an optical fiber to generate a reflected beam from scattering centers within the optical fiber. A detector records a plurality of frames of data generated by the reflected beam, and the controller tracks an evolution of a speckle pattern carried by the reflected beam from the plurality of frames and calculates a strain induced in a section of the optical fiber from the evolution of the speckle pattern.

13 Claims, 8 Drawing Sheets

(51) Int. Cl.
*G02B 6/02* (2006.01)
*H01S 3/11* (2023.01)

(56) References Cited

OTHER PUBLICATIONS

Murray et al. "Multimode fiber phase sensitive optical time domain reflectometry with holographic demodulation", Optics Express, vol. 26, No. 18, Sep. 3, 2018.
Zhang et al. "Fiber-optic laser speckle-intensity crack sensor for embedment in concrete", Sensors and Actuators A 126 (2006) 107-111.
Rodriguez-Cobo et al. "Optical fiber strain sensor with extended dynamic range based on specklegrams", Sensors and Actuators A 203 (2013) 341-345.
Reis et al. "Structural Health Monitoring Suitable for Airborne Components Using the Speckle Pattern in Plastic Optical Fibers", IEEE Sensors Journal vol. 17, No. 15, Aug. 1, 2017.

\* cited by examiner

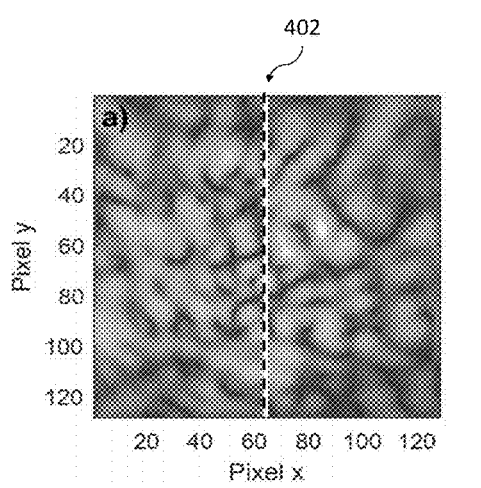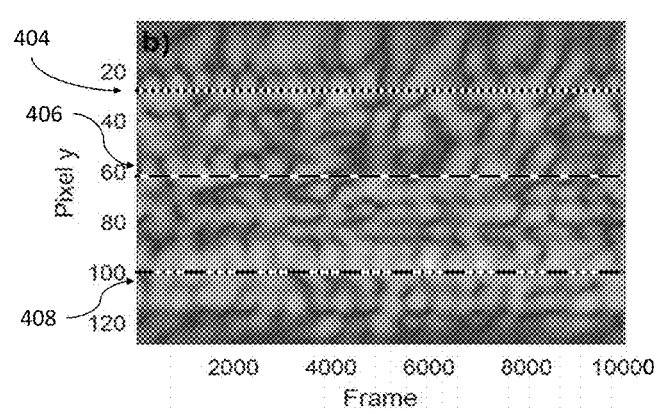
FIG. 4A
FIG. 4B

METHODS AND APPARATUSES FOR QUANTITATIVE SENSING USING RAYLEIGH SCATTERING IN OPTICAL FIBER

BACKGROUND

Field of the Invention

The present application relates generally to quantitative sensing using an optical fiber.

Description of Related Art

Fiber optic strain sensors are used for a wide variety of applications including perimeter security, structural health monitoring, and underwater acoustic arrays. Many of the most successful sensors take advantage of Rayleigh backscattering using a technique called φ-optical time-domain reflectometry (φ-OTDR). In Rayleigh scattering, light elastically scatters off of naturally occurring fluctuations in a fiber density and refractive index. However, standard, φ-OTDR sensors and systems are incapable of making a quantitative measurement of strain. While phase-measuring, coherent φ-OTDR sensors are capable of quantitative measurements, they require more sophisticated and expensive equipment and are susceptible to interference fading. It would therefore be beneficial to have a system that could provide a quantitative measurement of strain based on the amplitude of the Rayleigh backscattered light.

SUMMARY OF THE INVENTION

One or more the above limitations may be diminished by structures and methods described herein.

In one embodiment, an apparatus for quantitatively measuring strain in an optical fiber is provided. An optical source comprising an optical beam generator and a pulse generator receives instructions from a controller and generates a pulsed optical beam in response to those instructions. The pulsed optical beam is directed into the optical fiber to generate a reflected beam from scattering centers within the optical fiber. A detector records a plurality of frames of data generated by the reflected beam, and the controller tracks an evolution of a speckle pattern carried by the reflected beam from the plurality of frames of data and calculates a strain induced in a section of the optical fiber from the evolution of the speckle pattern.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4A is a recorded image from detector 114 showing a speckle pattern;

FIG. 4B is an image illustrating the evolution of a speckle pattern over time for a line of pixels in FIG. 4A;

Figure 1A:
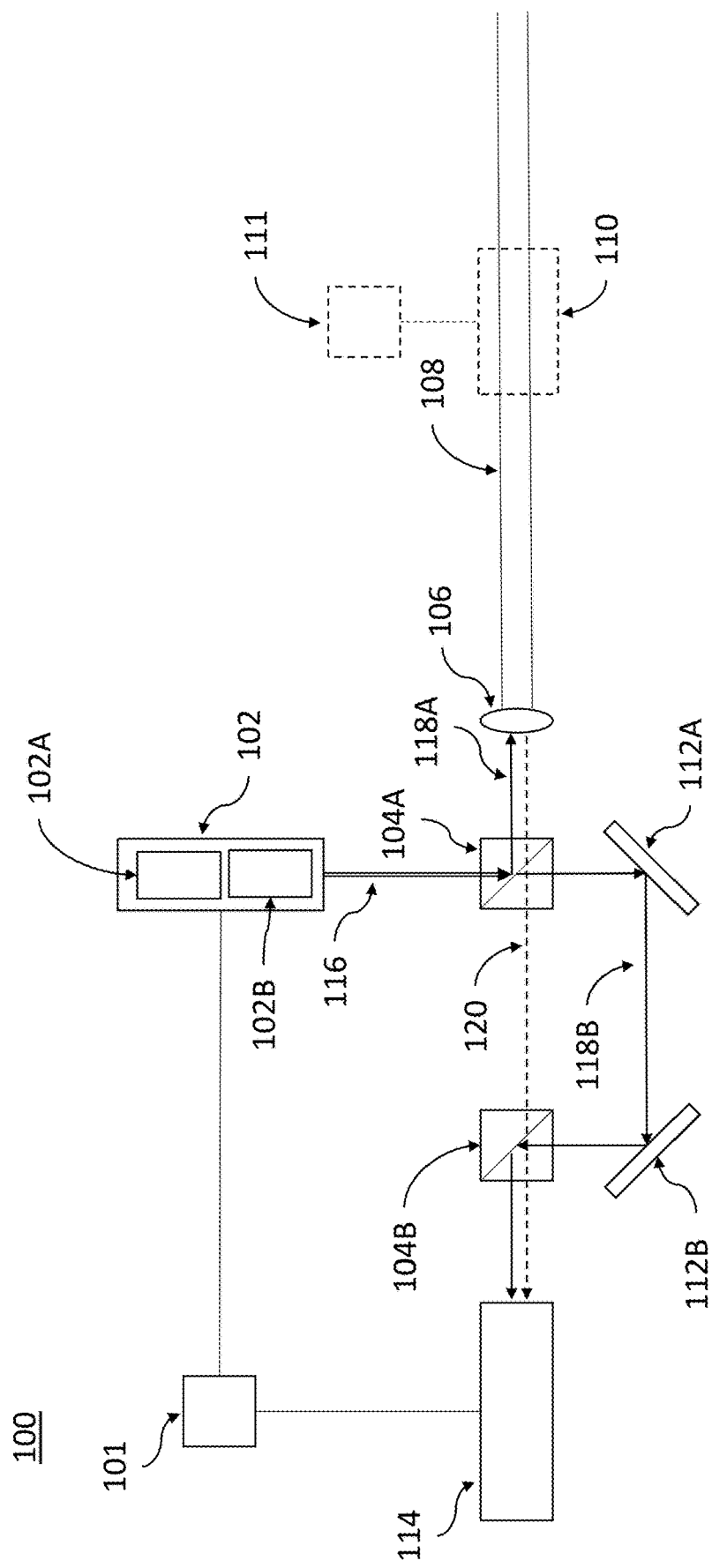
FIG. 1A is a schematic view of a system for quantitatively measuring strain in an optical fiber according to one embodiment.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are methods and apparatuses for quantitative sensing in a multimode fiber. Illustrative systems for quantitative sensing strain in a multimode fiber are described below. However, a person of ordinary skill will recognize that the disclosure is not limited to these particular systems, but rather that variations to these systems may be made and still within the disclosure of the invention. For example, while specific types of components are mentioned below, those components may readily be substituted for components with equivalent or substantially equivalent performance or properties, as one of ordinary skill in the art would appreciate.

FIG. 1A illustrates a system 100 for measuring strain in an optical fiber 108 according to one embodiment. In general, a controller 101 controls an optical source 102 to direct light in a controlled manner into a multimode optical fiber 108. A portion of that light is reflected back to detector 114 which records a plurality of images, each of which may be considered a frame. Those frames are analyzed by controller 101 to determine quantitatively the strain in given section of the fiber 108.

Turning to the specifics of system 100 of FIG. 1A, a controller 101 controls the optical source 102 to provide an optical beam 116 to a first beamsplitter 104A. Controller 101 may be a microcontroller, microcomputer, or a processor. Controller 101 is operably connected to memory (not shown) that stores a control program that, when executed, provides for overall control of system 100. In one embodiment, this may include instructions for controlling the optical source to produce a pulsed light beam of a predetermined duration at a predetermined frequency, and include instructions from processing image data recorded by detector 114. In that regard controller 101 is configured to receive and store data from detector 114 (as described below) in memory. The memory may also store temporary and final data that results from computations performed on data received from detector 114 in accordance with the control program. Such control program includes code to perform the methods described below. Controller 101 may also be configured to output data to another device through input/output (I/O) hardware (not shown). Such I/O hardware may include a USB connection or a display, among other examples.

Turning back to the embodiment shown in FIG. 1A, the optical source 102 comprises an optical beam generator 102A that generates an optical beam 116 and a pulse generator configured to generate optical pulses of a certain length in time and a certain frequency in accordance with instruction from the controller 101. Pulse generator 102B may be, for example, an acousto-optical modulator (AOM), and electro-optical modulator (EOM), or a semiconductor optical amplifier. However, as one of ordinary skill in the art will recognize other devices constructed to generate optical pulses may also be used. The optical beam generator 102A and the pulse generator 102B may be contained in a single physical unit or be contained in different physical units. In one embodiment, the optical beam 116 is a laser. For example, in one embodiment, a laser with a wavelength of 532 nm may be used. Of course, as one of ordinary skill will appreciate, the wavelength of laser is not limited to such a wavelength, rather a laser with any wavelength within the transparency window of the fiber 108 under test will work (typically 320-2300 nm). An exemplary optical beam generator 102A may be a high-power fiber laser such as IPG Phontonics GLR-50. The pulse generator 102B is configured to receive the optical beam 116 and generate a pulse optical 116 in accordance with instructions from controller 101. In one embodiment, the pulse generator 102B is configured to generate a pulsed optical beam 116 with pulse durations of approximately 1 ns to 1 µs. The duration of a pulse generated by pulse generator is set in accordance with the desired spatial resolution. However, there is a tradeoff between better spatial resolution and sensor sensitivity. While it may be possible to use shorter pulses to isolate a smaller section of fiber 108 for evaluation, the sensitivity of detector 114 is reduced. Thus, there is a practical lower limit to pulse duration that corresponds to the point where detector 114 can no longer generate useful data from which a quantitative measurement of strain can be performed. For example, a pulsed optical beam 116 with a pulse duration of 100 ns corresponds to a detection resolution of 10 meters. This means that a certain section of fiber 108 (section 110) that is 10 meters in length may be evaluated and strain therein may be quantitatively measured. By changing the pulse duration the length of section 110 may be increased or decreased as desired. As such a user may, through controller 101 or by interacting directly with AOM 102B, set a pulse duration corresponding to a desired length of fiber 108 over which the user wants to quantitatively measure strain. An exemplary fiber 108 may be a graded-index multimode fiber (Corning OM2) with a 50 micron core, a numerical aperture of 0.2, and which can support 870 spatial modes at 532 nm.

In FIG. 1A, beamsplitter 104A divides the optical beam 116 into two separate beams 118A and 118B. Beamsplitter 104A does not change the pulsed nature of beam 116. Thus, if beam 116 is pulsed by AOM 102B, beams 118A and 118B are pulsed as well. Moreover, beamsplitter 104A need not divide beam 116 evenly. Rather, in one embodiment, a majority of beam 116 may be directed into fiber 108 (e.g., 80% with ~1 W peak). Beam 118A is directed towards an optical element 106, which in one embodiment is a lens that focuses beam 118A into fiber 108, by beamsplitter 104A, and then proceeds into the optical fiber 108.

In one embodiment, optical fiber 108 is a multimode fiber that is a fiber that can support a plurality of optical modes. Preferably, fiber 108 can support 15 modes or more. If fiber 108 supports less than 15 modes, then strain information may still be recovered but will be susceptible to distortion due to the fact that response becomes less linear with fewer modes. In another embodiment, fiber 108 may be a single mode fiber. As discussed above, if a multimode fiber is used, preferably it supports 15 modes or more. This is because the technique described herein works best with 15 independent scattering realizations or more. This is easily achieved in a multimode fiber with numerous spatial modes present therein, but may also be achieved in a single mode fiber by injecting multiple wavelengths and/or polarizations of light into fiber 108 (in this case a single mode fiber). These independent scattering realizations are analogous to the speckle grains formed by interference between the modes in a multimode fiber and can be considered a speckle pattern. To produce the multiple optical frequencies, an optical frequency comb, a tunable laser, or a series of optical frequency shifters could be added to the system. Detector 114 would then detect the amplitude of all the individual scattering realizations and separate the response from the various realizations by using interferometric techniques, for example taking the Fourier transform of an interference pattern generated between the scattered light and a reference beam). The amplitude of the realizations are then used in the technique described below like the amplitude form the pixels in the plurality of recorded images.

The maximum length of fiber 108 over which strain can be quantitatively measured is dictated by attenuation in the fiber. This is because the technique described herein relies on Rayleigh scattering and the amplitude of the backscattered light must be sufficient to register above the noise of the detector 114. At some distance, the amplitude of the backscattered signal from a distant section of fiber 108 will be indistinguishable from noise at which point information on strain induced on that part of the fiber 108 cannot be quantitatively measured anymore. The typical length of the fiber 108 may range from 1 to 10 s of km. In an exemplary embodiment described below, the length of fiber 108 is 2 kilometers.

While beam 118A is provided to fiber 108, beam 118B is directed into a reference arm by beamsplitter 104A. In FIG. 1A, the reference arm comprises mirror 112A, mirror 112B, and beamsplitter 104B. Beamsplitter 104B directs beam 118B onto detector 114. In one embodiment, beamsplitter 104B may be a regular beamsplitter that divides the received light. However, in a preferred embodiment, beamsplitter 104B is a polarizing beam cube with a waveplate to ensure that all of the received light is directed to detector 114. In this preferred embodiment, a polarizer (not shown) may also be provided before detector 114 to ensure a good mixing efficiency with the backscattered light 120. In the embodiment shown in FIG. 1A, the reference arm serves two functions. First, it provides a mechanism with which to select for light backscattered from a specific region within fiber 108. The light scattered out of fiber 108 is nearly continuous since the light from the back of fiber 108 takes a longer time to reach detector 114 than light from the front of fiber 108. In the case of a 2 km fiber 108, this continuous stream of light is about 20 long. The pulses in beam 118B interfere with a portion of the light in beam 120 that is equal to the pulse duration (20-100 ns, typically). The pulses in 118B do not interfere with any other portion of the 20 µs stream. To recover the amplitude of light from a certain region (e.g., a 20-100 ns region), the interference pattern is measured and an interferometric technique (such as off-axis holography) is used to recover the amplitude of the light from only that region, as described below. The timing of the pulses in 118B is controlled by the user to select a particular point in the 20 µs stream, corresponding to a region 110 in the fiber. Second, it mitigates the effects of camera dark noise despite the relatively low backscattered light levels. Detector 114 may, in one embodiment, be a high speed camera such as a Vision Research Phantom v2512 which collects a 128×128 pixel image at a frame rate of 40 kHz and has an integration time (a time over which photons are collected) of 276 ns. As one of ordinary skill will appreciate, some or all of the components shown in FIGS. 1A-1C may be contained within a common housing with the exception of PZT 111 which is used for validation purposes, as described below. Moreover, the free-space components shown in this illustration could be replaced with fiber-optic components (e.g. beam splitters could be replaced with fiber optic evanescent couplers) enabling a compact and robust interrogation system. However, in practice, fiber 108 is typically located apart from the remaining components.

Figure 1B:
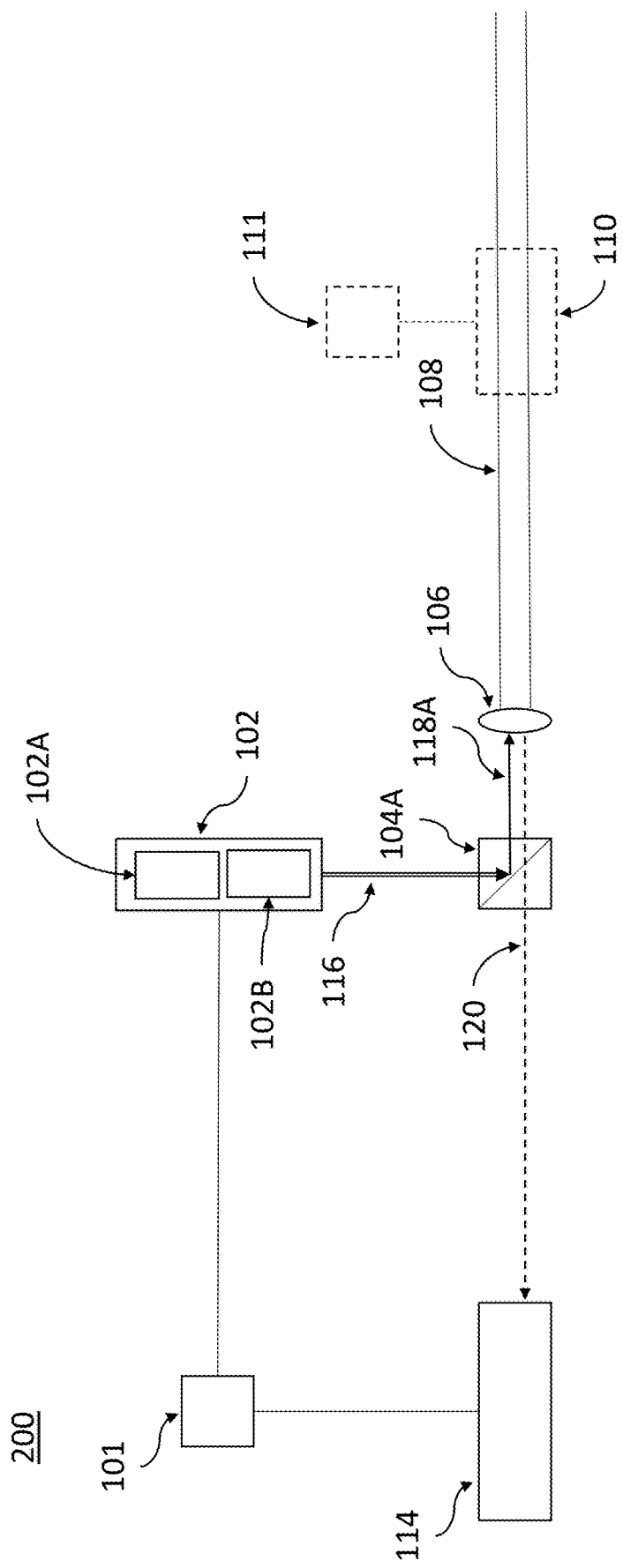
FIG. 1B is a schematic view of a system for quantitatively measuring strain in an optical fiber according to another embodiment.
Figure 1C:
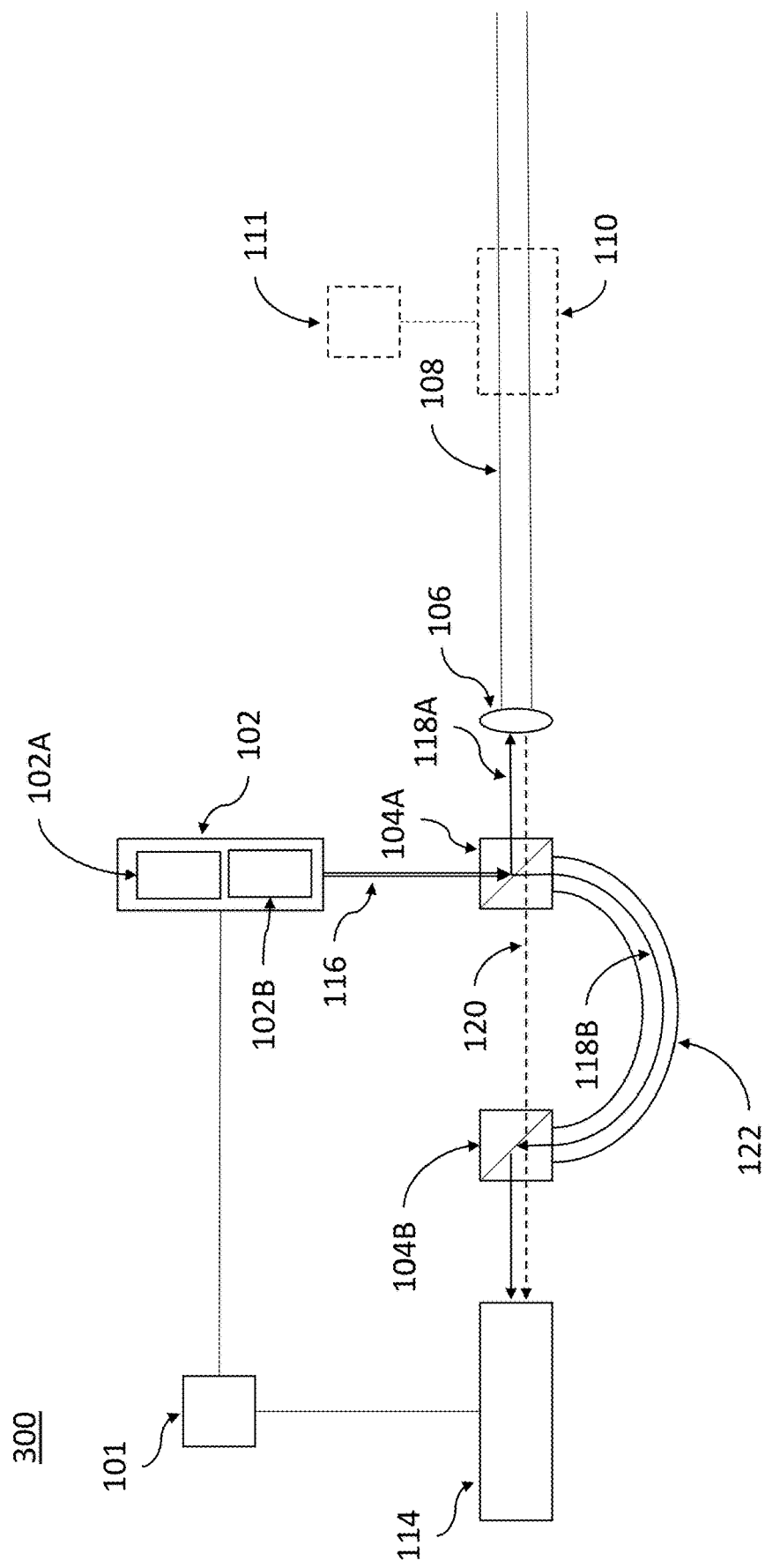
FIG. 1C is a schematic view of a system for quantitatively measuring strain in an optical fiber according to one embodiment.

Having described in general the components of system 100, alternate systems based on the general design of system 100 will be discussed in reference to FIGS. 1B and 1C. For brevity, a description of elements shown in FIGS. 1B and 1C which also appear in FIG. 1A is omitted. FIG. 1B shows a system 200 for measuring strain in the optical fiber 108 according to another embodiment. FIG. 1B is substantially similar to FIG. 1A, except that the reference arm formed by mirrors 112A, 112B, and beamsplitter 104B have been eliminated. The reference arm can be omitted by using a high speed camera for detector 114 with a fast mechanical shutter or optical shutter in front of detector. Preferably, the shutter speed should be matched to the optical pulse duration. This is because the shutter should be fast enough to select at a time slice of backscattered light from beam 120 that corresponds to the desired spatial resolution. For example, for a typical spatial resolution of 10 m, the mechanical shutter needs to be able to open and close within 100 ns.) In another embodiment, detector 114 may be exposure time matched to the optical pulse duration. Detector 114 may be constructed to record signal changes that occur on the order of the pulse duration which negates the need for a shutter. Controller 101 may then computationally select the desired region from the recorded time trace. As one of ordinary skill will appreciate, this property of detectors is typically specified by its frequency. So to resolve a 10 ns pulse duration, you would need at least a 100 MHz detector. Many photodetectors have frequencies in the GHz regime and thus are capable of resolving such durations. FIG. 1C shows a system 300 in which the reference arm comprises a single mode fiber 122 and beamsplitter 104B. The advantage to this embodiment, compared to the embodiment shown in FIG. 1A, is that by using a single mode fiber 122 to convey beam 118B to beamsplitter 104B, the system is more robust since beam 118B is not traveling through ambient.

Figure 2:
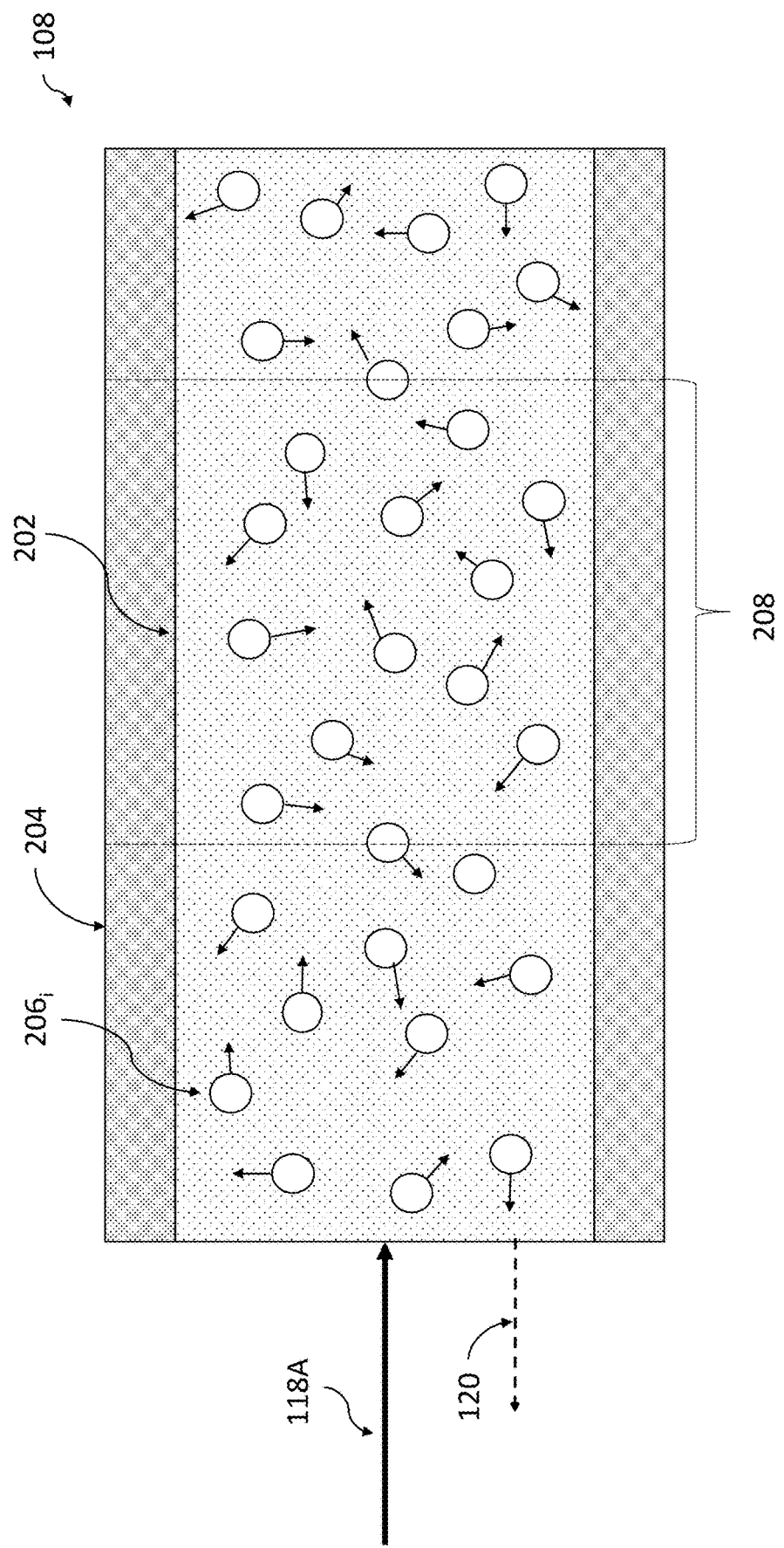
FIG. 2 is a cross-sectional view of an optical fiber illustrating Rayleigh scattering from a plurality of scattering centers.

The systems described herein operate based on Rayleigh scattering where light from beam 118A scatters off of small fluctuations in the density and refractive index of fiber 108. FIG. 2 illustrates the general principle of Rayleigh scattering.

In FIG. 2, beam 118A is propagating left-to-right through a section of fiber 108 that includes a core 202 and cladding 204. Fiber 108 is not perfectly homogenous. There are small fluctuations in the density and refractive index of the core material 202. When light from beam 118A is incident on a point of discontinuity, i.e., a point where the density and refractive index of the core material 202 changes slightly, the light may be scattered. Such points of discontinuity are considered scattering centers and are illustrated in FIG. 2 as white circles $206_i$. Light from beam 118A may be scattered in any direction from a scattering center $206_i$, as indicated by the arrows emanating from each scattering center $206_i$. Some of the light is scattered back towards optical element 106 to form beam 120. The scattered light beams from the scattering centers $206_i$ interfere with each other to create an interference condition known as a speckle pattern, which comprises a plurality of speckle grains. The speckle pattern is recorded by detector 114. In general, a single speckle grain is large enough to be measured by several pixels of the detector 114.

If a portion of the optical fiber 108 is disturbed such that strain is induced within the fiber 108, the relative positions of the scattering centers $206_i$ within that portion of fiber 108 are changed. Consider a section 208 of fiber 108 which is disturbed by an external factor such that strain is induced in section 208. The strain may be a result of a load being applied to fiber 108, a change in temperature of fiber 108, or other sources. Regardless of the source of the strain, the result is that the scattering centers $206_i$ in section 208 are disturbed which changes how light scatters from those centers $206_i$ resulting in a fluctuation in speckle pattern. This fluctuation information conveys information about the strain induced in section 208 of fiber 108. As described below, by monitoring the fluctuations in amplitude of recorded speckle pattern a quantitative measurement of strain in section 208 of fiber 118 can be made.

However, before a measurement of strain within section 208 can be made, light from that section needs to be isolated. In the embodiments depicted in FIGS. 1A and 1C, light corresponding to a certain section of fiber 108 (e.g., section 208) may be isolated from beam 120 using the reference arm. The amplitude of the backscattered speckle pattern is recovered under the control of controller 101 using off-axis holography, the technique for which is described in "Off-axis digital hologram reconstruction: some practical considerations", by N. Verrier and M. Atlan, Appl. Opt. 50(34), H136-H146 (2011), the contents of which are incorporated by reference herein in their entirety. Briefly, a two-dimensional Fourier transform of an image recorded by detector 114 is used to identify the spatial frequencies associated with the speckle pattern. A Hann window filter is applied around those spatial frequencies in the Fourier domain and an inverse Fourier transform is used to recover the amplitude and phase of the speckle pattern. The phase information may then be discarded. The speckle amplitude recovery process is completed for each frame collected by detector 114 providing a time-dependent amplitude at each pixel.

In another embodiment, detector 114 may be a high speed camera with a fast mechanical shutter or an optical shutter placed in front of detector 114. Still in another embodiment, detector 114 time-gates the response directly with the spatial resolution of detector 114 being determined by the time resolution of the gate, as discussed above. Detector 114 records the amplitude of the backscattered speckle pattern from a specific region within the fiber. As one of ordinary skill will recognize, the Nyquist limit dictates that the sensor detection bandwidth is limited to frequencies up to half the frame rate of the recording.

Having described the components of system 100 and how those components are used, in various embodiments, to record a backscattered image from a particular region of fiber 108, attention will now be directed to an algorithm for extracting quantitative strain information from those images. However, to understand the function of that algorithm it is important to understand the relationship between strain and the evolution of the speckle pattern. As discussed above, the technique described herein relies upon a speckle pattern comprising a plurality of speckle grains recorded by detector 114. One challenge, however, is that the responsivity, or the change in amplitude of a speckle grain for a given change in strain, is different for each speckle grain and is constantly changing. The sign of the responsivity factor can also be different for each speckle grain and can even change over time. Thus, at a given time, a positive strain will cause an increase in the amplitude of some speckle grains in the speckle pattern while decreasing the amplitude of other speckle grains. Extracting a linear response thus involves identifying which speckle grains are increasing with strain and which speckle grains are decreasing with strain. To do this, an assumption is made that changes in the speckle pattern are the result of a change in strain across the sensor (as opposed to shot noise in the measurement). Under this assumption, the change in amplitude of each speckle grain, in the speckle pattern, was induced by some applied strain, thus providing a means to group speckle grains according to the sign of their responsivity. In other words, speckle grains whose amplitude increased over some period of time have responsivity factors with a common sign, while speckle grains whose amplitudes decrease over this time range have responsivity factors with the opposite sign. Using this assumption to identify the "sign" of the responsivity for each speckle grain over time, the average of the change in amplitude across the entire speckle pattern can be used to achieve a linear response rate. One of the advantages of this approach is that it does not require any form of calibration since the strain is recovered from the evolution in the speckle pattern without requiring prior knowledge of the speckle pattern produced at different levels of strain. This approach also allows the fiber 108 to be repositioned (e.g., bent or twisted) without requiring any form of re-calibration before continuing to use it as a sensor.

Having described, briefly, the relationship between the evolution of the speckle pattern and strain, and how that relationship can be exploited to perform a quantitative strain measurement, attention will now be directed to a general description of one way in which optical images are processed to extract strain information followed by a more detailed description of the algorithm behind that process.

As discussed above, detector 114 returns an image of the backscattered light from beam 120. Detector 114 continually generates images during the monitoring process resulting in a plurality of images or frames. Each pixel in a frame is assigned a flag indicating whether its amplitude is trending positive or negative with strain. This assignment is achieved by monitoring several frames of data and tracking the trend of each pixel amplitude. The change in each pixel across adjacent frames are then aligned in slope using their sign flags and summed across all pixels to determine the slope-corrected change in the returned optical amplitude. The slope-corrected change is then integrated across frames to recover the strain in the fiber. Since the slope of the amplitude for each pixel will eventually change with strain, a test is used to determine when the sign flags need to be updated. Having described the algorithm in general, the details of the algorithm will be explained below in reference to FIG. 3.

Figure 3:
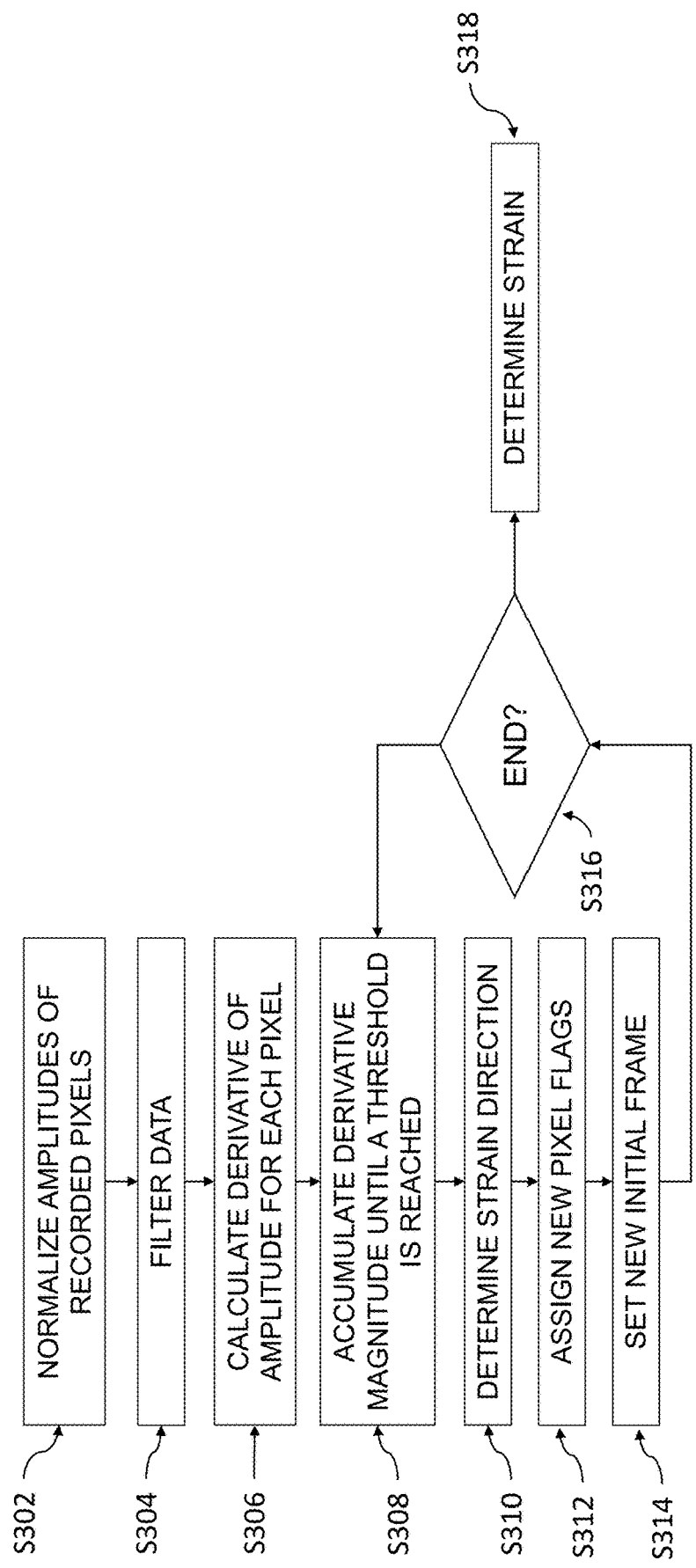
FIG. 3 is a flowchart illustrating the steps in quantitatively measuring strain in an optical fiber according to one embodiment.

FIG. 3 is a flowchart showing the steps involved in extracting quantitative strain data from a plurality of recorded images (frames). First, in S302, the amplitude of each recorded pixel is normalized to an average amplitude of an entire speckle pattern recorded for that frame. This results in a standard scale for the amplitude of each data set that is referred to as an amplitude unit (a.u.). The normalization removes relative intensity noise from the data and permits the calculation of a conversion factor (discussed below) from a.u. to strain that is independent of the backscattered light level and detector responsivity. Next, in S304, a filter is applied to the pixel data for a given frame to remove spurious high frequency intensity changes that can degrade performance. In an exemplary embodiment, the filter is a low pass filter with a pass band of 5 kHz and a stop band of 10 kHz. This filtering ensures that changes in the speckle pattern that set the sign of the speckle grains are due to strain in the fiber rather than simply noise in the measurement.

Next, in S306, the numerical derivative of the amplitude evolution is calculated for each pixel by Equation 1 below:

$$A_m'(n) = A_m(n+1) - A_m(n) \qquad \text{Equation 1:}$$

where A is the intensity, n is the frame number, and m is the pixel number. Next, in S308, the value of the derivative is accumulated from $n_i = n_{start}$ to a frame N, as shown in Equation 2 below.

$$\Delta A_m = \Sigma_{n=n_{start}}^{N} A_m'(n) \qquad \text{Equation 2:}$$

The value of N is such that the median of $|\Delta A_m|$ reaches a user-defined threshold $dA_{thresh}$. Pixels are initially assigned pixel flags $f_m(n)$ based on the sign of $\Delta A_m$. Next, in S310, the strain direction d is determined by the previous pixel flags and $\Delta A_m$ according to Equation 3 below.

$$d = \text{sgn}(\langle f_m(n_{start}-1)\Delta A_m \rangle) \qquad \text{Equation 3:}$$

Then, in S312, new pixel flags are assigned based on the strain direction and the sign of $\Delta A_m$, according to Equation 4 below.

$$f_m\left(n_{start} \to \frac{n_{start}+N}{2}\right) = \text{sgn}(\Delta A_m) \times d \qquad \text{Equation 4}$$

Next, in S314, a new initial frame is assigned by Equation 5 below.

$$n_i = \frac{n_{start}+N}{2} + 1 \qquad \text{Equation 5}$$

In S316, a decision is made about whether the algorithm has reached the end of the recorded frames. If N has reached the end of the recorded frames, then the process proceeds to S318. If, however, N has not reached the end of the recorded frames, then the process returns to S308. In S318, the change in strain $d\varepsilon(n)$ is determined by averaging the change in intensity with the pixels flags over all pixels, by Equation 6 below.

$$d\varepsilon(n) = \frac{1}{M}\sum_m f_m(n)A_m'(n) \qquad \text{Equation 6}$$

In Equation 6, M is the total number of pixels. The raw unfiltered derivative is used in Equation 6 to maximize the sensor bandwidth. The strain can then can be calculated by Equation 7 below.

$$\varepsilon(n) = \Sigma_{n=1}^{n} d\varepsilon(n) \qquad \text{Equation 7:}$$

The result is a quantitative measurement of the strain in fiber 108 as a function of time. This algorithm may be implemented in post-processing by controller 101 or in real time with only minimal latency. Having described the algorithm by which a quantitative measurement of strain can be recovered. Attention will now be directed to an exemplary operation of system 100 to illustrate the operation of the algorithm.

Figure 5:
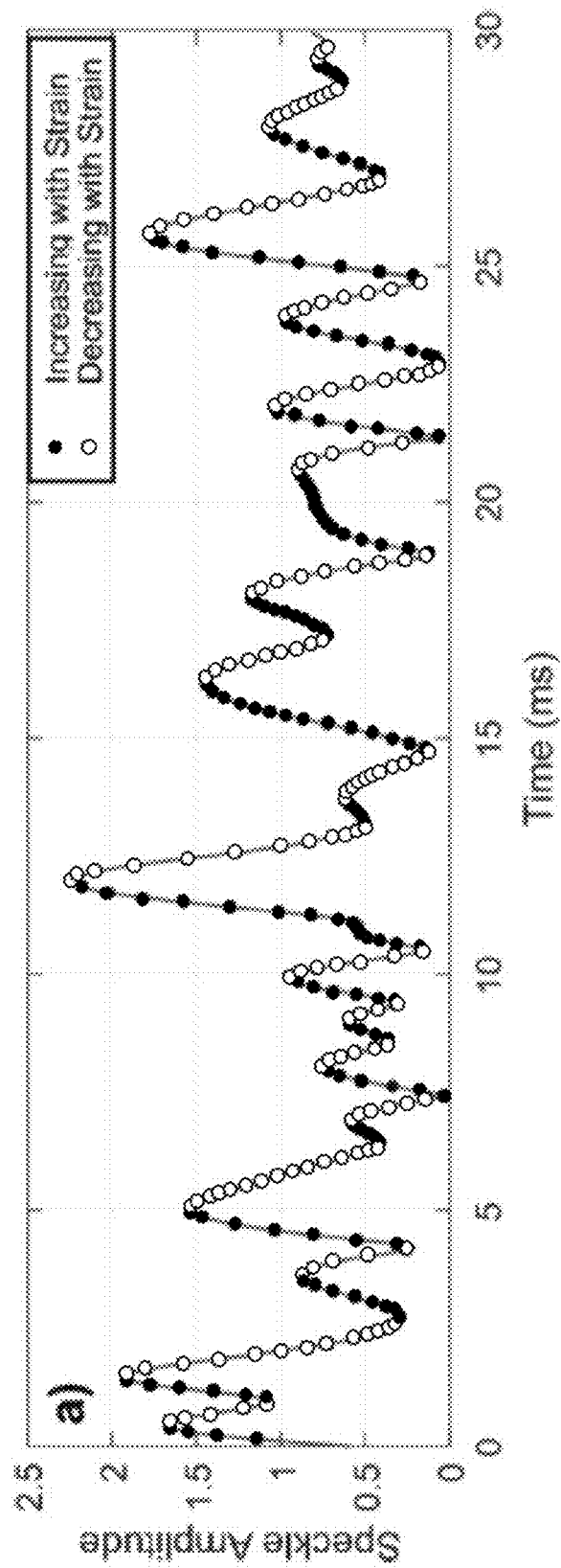
FIG. 5 is a plot of speckle amplitude for a single pixel from the line of pixels shown in FIG. 4B over time.
Figure 6:
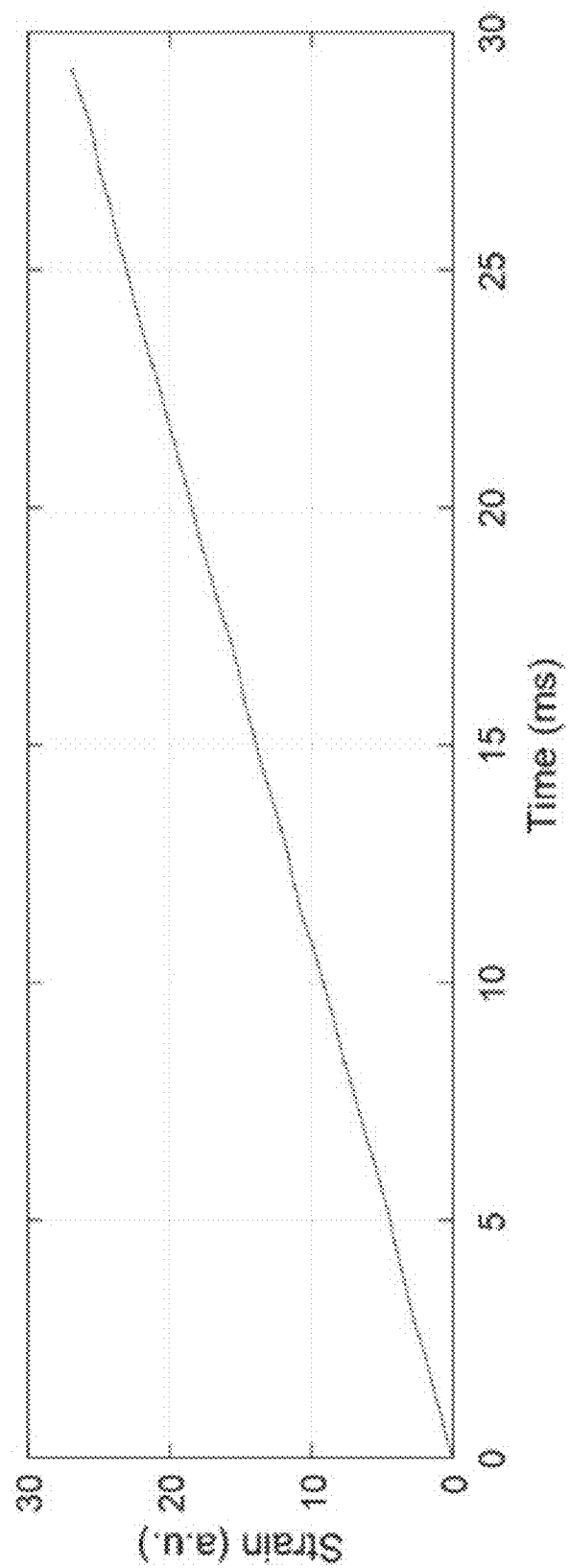
FIG. 6 is a plot of calculated strain in an optical fiber over time.

FIG. 4A is an image of one recorded frame from detector 114. In this example, detector 114 is a 128×128 pixel detector as indicated by the x and y axes. Line 402 identifies a line of pixels $y_1 \ldots y_{128}$ that correspond to a pixel in the middle of the x-axis, $x_{64}$. FIG. 4B shows the fluctuations in recorded amplitudes for line 402 over 10,000 recorded frames. A plot for any individual pixel can be made by selecting y pixel and then extracting the amplitude for that x,y combination (e.g., lines 404, 406, and 408). FIG. 5 is a plot of amplitudes for line 404 in FIG. 4B. FIG. 6 is a plot of strain induced in a section of fiber 108 that was calculated by the algorithm described above operating on data recorded by detector 114 over the 10,000 frames. As can be seen from FIG. 6, the strain applied to section 110 of fiber 108 increased linearly over the 30 ms recording period. This is because a piezo-electric transducer (PZT) 111 was used to apply a linearly increasing load to section 110 of fiber 108, in order to simulate an applied load. Of course, as one of ordinary skill will appreciate, the PZT 111 is not necessary in practice and was used only to validate the measuring capabilities of the systems described herein. In practice, the load applied to a region of interest along fiber 108 could come from an external source or be generated by temperature changes, among other possible causes. Since the load applied to fiber 108 was a linearly increasing strain, it is not surprising that the pixel flags in FIG. 5 simply match the sign of the slope of the speckle amplitude.

Finally, to recover a quantitative strain measurement using the systems described herein, it is necessary to measure the system's responsivity in order to convert from normalized amplitude units to units of strain. For any system, the sensor responsivity can be experimentally measured. First, a strain is imparted on fiber 108 and the resulting strain is measured. This can be done by constructing a separate Mach-Zehnder interferometer in which the fiber 108 wrapped with PZT 111 comprises one arm of the interferometer. A sinusoidal signal can then be applied to PZT 111 and the phase recorded using the technique described in Murray et al. "Multimode fiber Φ-OTDR with holographic demodulation" Opt. Express 26(18), 23019 (2018) and Redding et al. "Measuring vibrational motion in the presence of speckle using off-axis holography" Appl. Opt. 55(6), 1406-1411 (2016), the contents of which are incorporated by reference herein in their entirety. This provides a PZT strain response value. Systems 100, 200, and 300 can then be setup to calculate the responsivity. PZT 111 is positioned at a certain point along fiber 108. For example, in one test, the PZT 111 was positioned 14 meters down the fiber 108. A portion of fiber 108 is wrapped on the PZT 111 to ensure that the portion of fiber is experiencing the same strain. In order to ensure that constant strain was experienced through the sensor region 110, controller 101 set the pulsewidth to 20 ns, make the length of the sensor region approximately 2 meters. This ensured that the sensor region 110 fell within the region of fiber 108 over which the PZT 111 apply the strain. Controller 101 then drove PZT 111 with a 1 kHz sine wave at a voltage of 100 mVpp. The signal in amplitude units (a.u.) was measured using the algorithm and processes described above to determine the amount of strain imparted to the fiber 108. The responsivity was scaled by the 2 meter sensor length to yield a value $R=5.63\times10^{-3}$ au/nε/m. As one of ordinary skill will recognize, this value is wavelength dependent and that this particular value corresponds to wavelength of 532 nm. With this value established, it can be used to convert the measured amplitude units extracted by the speckle tracking algorithm and processes described above to units of strain. One of the advantages of converting the measured speckle pattern to normalized amplitude units is that the sensor responsivity can then be used for different sensor regions along fiber 108 or for different multimode fibers altogether.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus for quantitatively measuring strain in an optical fiber, comprising:
    a controller;
    an optical fiber;
    an optical source comprising an optical beam generator and a pulse generator, wherein the optical source is configured to receive instructions from the controller and generate a pulsed optical beam in response to the instructions, wherein a portion of the pulsed optical beam is directed into the optical fiber to generate a reflected beam from scattering centers within the optical fiber; and
    a detector configured to record a plurality of frames of data generated by the reflected beam,
    wherein the controller is configured to track an evolution of a speckle pattern carried by the reflected beam from the plurality of frames of data and calculate an amount of strain induced in a section of the optical fiber from the evolution of the speckle pattern.

2. The apparatus of claim 1, wherein a wavelength of the pulsed optical beam is within a transparency window of the optical fiber.

3. The apparatus of claim 2, wherein the wavelength of the pulsed optical beam is between 320-2300 nm, inclusive.

4. The apparatus of claim 1, wherein a duration of the pulsed optical beam is between 1 nanosecond and 1 microsecond, inclusive.

5. The apparatus of claim 1, wherein a duration of the pulsed optical beam corresponds to a length of the section of the optical fiber over which the amount of strain is calculated.

6. The apparatus of claim 1, wherein the optical fiber is a multimode fiber.

7. The apparatus of claim 1, wherein the optical fiber supports 15 optical modes.

8. The apparatus of claim 1, further comprising:
a first beamsplitter configured to receive the pulsed optical beam and direct the portion of the pulsed optical beam into the optical fiber.

9. The apparatus of claim 8, further comprising:
a reference arm that includes:
- a first mirror configured to receive another portion of the pulsed optical beam that is not directed into the optical fiber,
- a second mirror configured to receive the other portion of the pulsed optical beam from the first mirror, and
- a second beamsplitter configured to receive the other portion of the pulsed optical beam from the second mirror and direct the other portion of pulsed optical beam into the detector.

10. The apparatus according to claim 9, wherein the second beamsplitter is a polarizing beam cube that includes waveplate that directs an entirety of the other portion of the pulsed optical beam received from the second mirror into the detector.

11. The apparatus according to claim 1, wherein the detector includes a mechanical shutter and a speed of the mechanical shutter is matched to a duration of the pulsed optical beam.

12. The apparatus according to claim 1, further comprising an optical shutter disposed in front of the detector, wherein a speed of the optical shutter is matched to a duration of the pulsed optical beam.

13. The apparatus according to claim 1, wherein the detector is constructed to record signal changes that occur on an order of a duration of the pulsed optical beam.

* * * * *